United States Patent Office 3,395,609
Patented Aug. 6, 1968

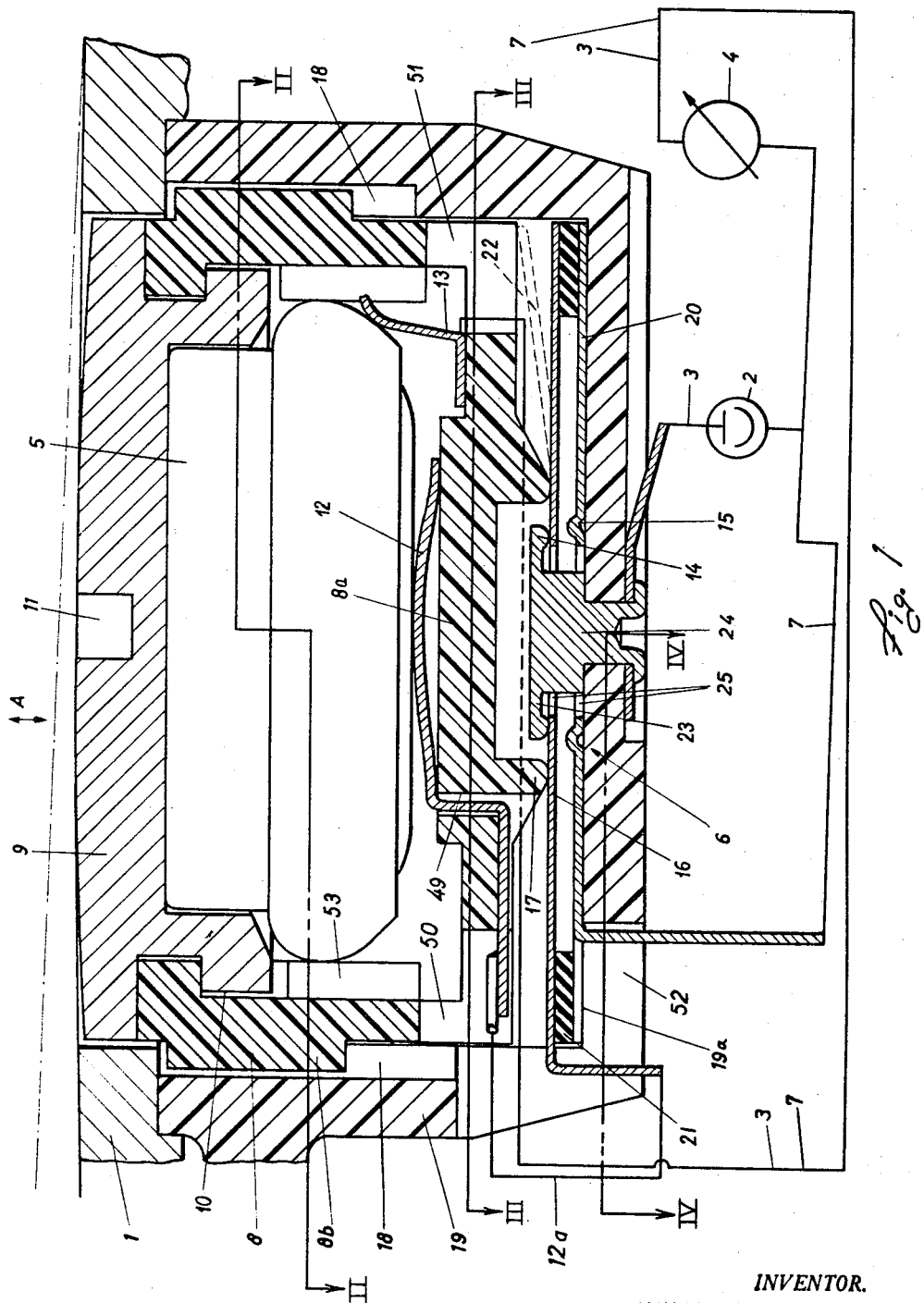

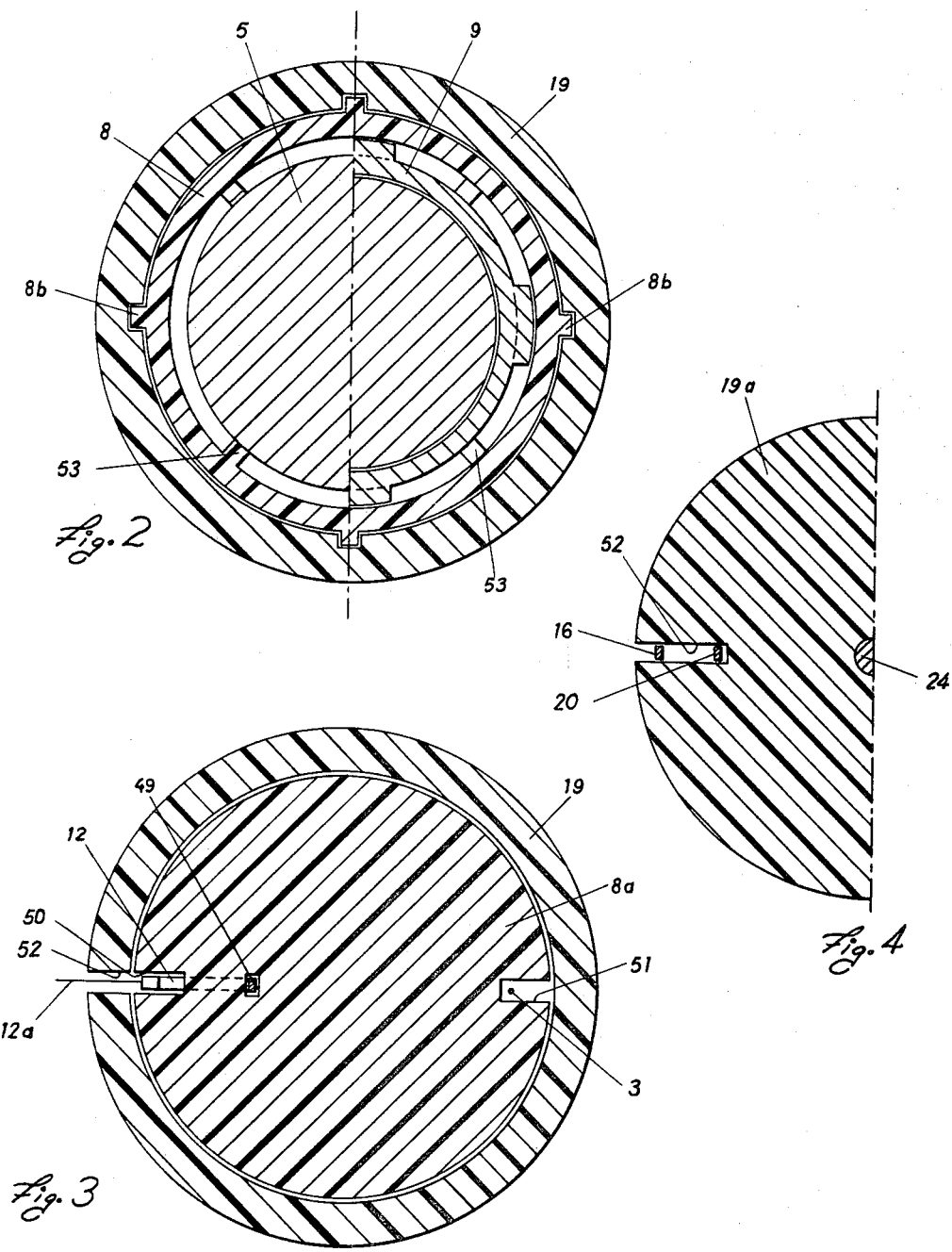

3,395,609
LIGHT METER
Wilhelm Bertram, Munich-Pasing, Germany, assignor to Ernst & Wilhelm Bertram, Fabrik Phototechnischer Messgerate, Munich-Pasing, Germany
Filed May 25, 1964, Ser. No. 369,722
4 Claims. (Cl. 88—23)

ABSTRACT OF THE DISCLOSURE

A light meter including a battery-energized circuit containing a photo resistance therein and a meter device for visually indicating light conditions. A test circuit is provided for permitting testing of the battery voltage. A manually actuated switch permits alternate connection of the battery into either the meter circuit or the test circuit.

This invention relates to a light meter including a battery-energized circuit containing a photo-resistance, further having a test circuit for the testing of the battery voltage and a switch for the alternate connection of the battery into the meter or the test circuit.

A familiar light meter of this type is equipped for the purpose of activating the switch with a slide-like switch device which can be adjusted from the outside through a cutout in the wall of the light meter housing. The switch device involves an undesirable manufacturing expense and its space requirements are not inconsiderable. Furthermore, the wall of the light meter housing must be broken through with the resulting necessity of special packings.

It is the aim of this invention to eliminate these disadvantages. This is accomplished according to the invention, by housing the battery in a slidable battery housing and by constructing this housing as a key for activating the switch.

In the light meter according to the present invention, a special switching device for activating the switch becomes unnecessary. It is replaced by the battery housing, which is necessary anyway and thus the battery housing fulfills two functions. This secures a reduction in the number of necessary parts and of the space required. Further, a hard-to-seal cutout in the light meter housing is no longer needed.

A specific embodiment of the invention is shown in the drawings in which:

FIGURE 1 is a section taken through a part of the light meter, with the battery housing and the switch being visible.

FIGURE 2 is a sectional view taken on the line II—II of FIGURE 1.

FIGURE 3 is a sectional view taken on the line III—III of FIGURE 1.

FIGURE 4 is a sectional view taken on the line IV—IV of FIGURE 1.

In FIG. 1, the housing 1 of a light meter contains a schematically indicated photo-resistance 2 as a light-sensitive element. This resistance 2 is located in a meter circuit 3 which in addition contains meter device 4, for instance a rotatable coil meter. The meter current is supplied by battery 5. For the testing of the sufficiency of voltage in battery 5, a switch is provided which in the drawing is generally indicated at 6. This switch makes it possible to switch the battery into test circuit 7. In the embodiment shown, the meter device 4 is also located in the test circuit so that the meter device will show whether the battery voltage is still within the acceptable range. Current circuit 3 and test circuit 7 thus partly coincide.

According to the invention, battery 5 is located in a housing 8 preferably of electrically non-conductive material, such as plastic, and which within the light meter housing 1 can be moved in the directions of double arrow A. A plurality of circumferentially spaced ribs 53 extend radially inwardly from the circumferential wall of the housing 8 for radially centering the battery 5 therewithin. Battery housing 8 is also constructed as a key for the activation of switch 6.

The outside of the battery housing 8 is closed by cover 9 which is connected with housing 8 by a bayonet closing slot 10. Cover 9 contains slot 11, into which a coin or a tool can be entered for the purpose of turning cover 9 when it is desired to remove same, as for replacing the battery. On the base of housing 8 is contact spring 12 which has contact with one of the battery poles, while a second contact spring 13 is in contact with the other battery pole.

In the preferred construction shown, switch 6 is provided with a first fixed contact 14 which is connected to meter circuit 3. The switch is further provided with a second fixed contact 15 which is located in the test circuit 7. The two fixed contacts are located under base 8a of the battery housing. Between the two fixed contacts 14 and 15 is found a movable switch contact 16 which is supported directly on battery housing 8. Movable switch contact 16 is spring-pressed against fixed contact 14 by means described hereinafter. By pressure against battery housing 8, overcoming the spring force, the movable switch contact 16 can be pressed against fixed contact 15. Movable switch contact 16 is connected by conductor 12a, and contact spring 12, with one pole of battery 5. The contact spring 12 extends downwardly through an opening 49 in the bottom wall 8a and extends radially outwardly therefrom. Narrow slits 50 and 51 extend outwardly through adjoining portions of the peripheral wall and bottom wall 8a of the housing 8 at circumferentially spaced points thereon. The slit 50 is aligned with the outer end of contact spring 12 and facilitates connection thereof to the conductor 12a. The slot 51 allows connection of the contact spring 13 with the circuits 3 and 7.

To accomplish its purpose, movable switch contact 16 has been constructed as an elastic disk which supports battery housing 8 by means of an annular rim 17 provided on base 8a. Because of the support on annular rim 17, considerable tolerance is permitted to the exactness of the guidance of battery housing 8. It is sufficient if the battery housing has sideward tongue-like protrusions 8b which enter into guidance grooves 18.

The light meter housing is advantageously connected with a nonconductive receptacle 19 which serves for the holding of battery housing 8 and contains the guide grooves 18. Fixed contact 15 associated with test circuit 7 in this case can be a part of contact disk 20 which lies on base 19a of the receptacle 19 and is secured against sideward displacement by the walls of the receptacle 19. The contact point itself can for instance be constructed as an annular bead pressed into disk 20. The disk consituting movable switch contact 16 should also be constructed in such a manner that it is secured against sideward displacement by the wall of receptacle 19. Contact disk 20 can be spaced from movable, springy disk 16 by an elastic and insulative ring 21, perhaps constructed of rubber. This construction results in an especially flat construction consisting of very few parts.

To support battery housing 8, tongues 22 can be pressed out of the disk constituting the movable switch contact 16. These tongues serve as a support for base 8a of battery housing 8.

Fixed contact 14, associated with meter circuit 3, is suitably provided on an annular flange 23 which protrudes above disk-like movably switch contact 16 radially from contact post 24 with which meter circuit 3 is connected. Contact post 24 extends through central openings 25 in the contact disk 20 and in the disk-like switch contact 16 but without touching them. In this construction it is possible to let flange 23 enter into the interior of annular rim 17 which also helps to secure a low construction height.

In the normal position of switch 6, meter current circuit 3 is closed while test circuit 7 is open. The current flows from one pole of battery 5 by way of contact spring 12, conductor 12a, movable switch contact 16, fixed switch contact 14 and contact post 24 to photo-resistance 2 and thence to meter 4. Resistance changes in the photo-resistance 2 can be read on meter device 4. The latter device is connected with the second battery pole by way of contact spring 13.

If battery housing 8 is moved inwardly by pressure on cover 8, annular rim 17 will press the movable switch contact 16 downward. The connection between fixed contact 14 and movable contact 16 is now interrupted. Overcoming the resilience of disk-like switch contact 16 and the elasticity of ring 21, switch contact 16 is now pressed against fixed contact 15. The current now flows from one battery pole by way of contact spring 12, conductor 12a, switch contact 16, and fixed contact 15 to test circuit 7 which bypasses photo-resistance 2 and is conducted directly to meter 4. The latter indicates whether there still is sufficient battery voltage. Meter and test circuits may, if desired, contain additional electric elements which are not of interest in connection with the present invention and hence need not be described.

The invention is not restricted to the embodiment shown. It is particularly possible to change the arrangement and the switching of the various contacts, as long as an activation of the switch by the battery housing is possible.

All characteristics to be derived from the description and the drawing, including their details and in various combinations, can be inventive.

What is claimed is:
1. A light meter comprising in combination:
   housing means;
   meter circuitry means containing a photo resistance therein;
   a battery adapted to supply energy to said meter circuitry means;
   test circuitry means for testing the battery voltage;
   switch means for selective connection of the battery to either the meter circuitry means or the test circuitry means, said switch means including a movable switch contact positioned between first and second fixed switch contacts, said first fixed switch contact being connected to the meter circuitry means and the second fixed switch contact being connected to the test circuitry means, said movable switch contact being connected with one pole of said battery;
   resilient means urging said movable switch contact against said first fixed switch contact; and
   a battery housing having the battery positioned therein with said battery housing being mounted in said housing means for shiftable movement relative thereto, said battery housing having a manually operable portion for causing shifting movement thereof for activating said switch means for selective connection thereof to either said meter circuitry means or said test circuitry means;
   said battery housing further having a base portion positioned above said movable switch contact so that application of pressure to said manually operable portion causes said battery housing to be shifted whereby said base contacts said movable switch contact and, after overcoming the force of said resilient means, causes said movable switch contact to be pressed against the second fixed switch contact to connect said battery with said test circuitry means.

2. A light meter as defined in claim 1, wherein:
   said movable switch contact and said resilient means comprise a movable resilient disk on which the base portion of the battery housing is supported.

3. A light meter as defined in claim 2, wherein:
   said housing means is provided with a cup-shaped opening therein for holding and guiding the battery housing;
   said second fixed switch contact comprising a contact disk positioned adjacent the bottom of said cup-shaped opening and being confined against lateral movement by the surrounding walls thereof;
   said movable resilient disk constituting the movable switch contact also being confined against lateral movement by the surrounding walls of the cup-shaped opening; and
   a spacer ring positioned between the movable resilient disk constituting the movable switch contact and the contact disk constituting the second fixed switch contact.

4. A light meter as defined in claim 3, wherein:
   said housing means is provided with a contact post secured thereto and extending through openings provided in the contact disk and the movable resilient disk, said post having an annular flange extending therefrom directly above said movable resilient disk with said first fixed switch contact being fixedly secured to said flange.

References Cited
UNITED STATES PATENTS

| 2,171,304 | 8/1939 | Gelardin | 240—10.68 |
| 2,630,735 | 3/1953 | Rouy | 88—14 |
| 3,147,680 | 9/1964 | Stimson | 88—23 X |
| 3,180,209 | 4/1965 | Crandell | 88—23 |

JEWELL H. PEDERSEN, *Primary Examiner.*

W. A. SKLAR, *Assistant Examiner.*